J. A. Gridley,
Churn,

N° 6,411.      Patented May 1, 1849.

UNITED STATES PATENT OFFICE.

JOSIAH A. GRIDLEY, OF SOUTHAMPTON, MASSACHUSETTS.

CHURN-DASHER.

Specification of Letters Patent No. 6,411, dated May 1, 1849.

*To all whom it may concern:*

Be it known that I, JOSIAH A. GRIDLEY, of Southampton, in the county of Hampshire and State of Massachusetts, have invented a new and Improved Churn-Dasher, and that the following is a full, clear, and exact description of the principle or character which distinguishes it from all other things before known and of the usual manner of making, modifying, and using the same, reference being had to the accompanying drawings, in which—

Figure 3:
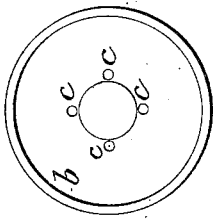
Figure 2:
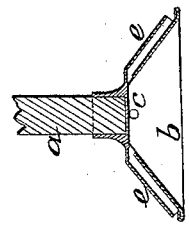
Figure 1:
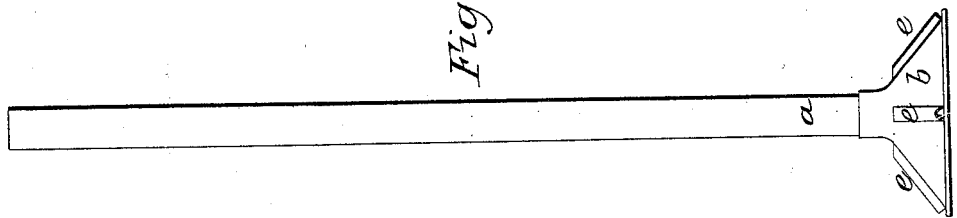

Figure 1, is a side elevation of the dasher; Fig. 2, a section thereof; Fig. 3, a plan of the under side of the dasher.

My invention consists in so constructing a churn dasher as to force air under the cream in the churn, and diffuse the same through it without the employment of valves or other movable parts in the dasher, which are liable to get out of order, and also saving the expense of forming the handle of the dasher hollow.

The construction is of the simplest character, while its effects are equal to those more complicated and expensive. The handle (*a*,) is a straight round stick, to the lower end of which a hollow cone (*b*,) is affixed, of metal or other suitable material; at the point where this cone (*b*,) joins the handle, or near the apex, are four, more or less holes, (*c*,) made through said cone; from these holes small pipes or tubes (*e*,) extend down the outside of the cone to near its base, as clearly shown in the drawing, where they terminate in an open end within the circumference and above the base of the cone. When this dasher is forced into the cream it incloses and compresses a quantity of air; and as the cream rushes up into it the air is drawn out through the tubes (a partial vacuum being created at their openings above the cone) and disperses through the cream, and agitates it as other air dashers. It is obvious that other figures than a cone would answer, and would be substantially the same thing.

Having thus fully described my improved dasher, what I claim therein as new, and for which I desire to secure Letters Patent, is—

The above described dasher, made concave, with openings around it for dispersing air throughout the cream, without the use of valves, constructed and arranged substantially in the manner set forth.

JOSIAH A. GRIDLEY.

Witnesses:
 JONATHAN N. JUDD,
 Y. JANE JUDD.